(12) United States Patent
Winsness et al.

(10) Patent No.: US 7,608,729 B2
(45) Date of Patent: Oct. 27, 2009

(54) METHOD OF FREEING THE BOUND OIL PRESENT IN WHOLE STILLAGE AND THIN STILLAGE

(75) Inventors: David J. Winsness, Alpharetta, GA (US); David Fred Cantrell, Lakemont, GA (US)

(73) Assignee: GS Cleantech Corporation, New York, NY (US)

( * ) Notice: Subject to any disclaimer, the term of this patent is extended or adjusted under 35 U.S.C. 154(b) by 0 days.

(21) Appl. No.: 11/688,425

(22) Filed: Mar. 20, 2007

(65) Prior Publication Data

US 2007/0238891 A1 Oct. 11, 2007

Related U.S. Application Data

(63) Continuation of application No. PCT/US2007/062301, filed on Feb. 16, 2007.

(60) Provisional application No. 60/773,947, filed on Feb. 16, 2006.

(51) Int. Cl.
*C11B 1/00* (2006.01)
*C11B 13/00* (2006.01)

(52) U.S. Cl. .......................... 554/9; 554/177

(58) Field of Classification Search ................ 426/417; 435/161; 554/8, 9, 177, 178
See application file for complete search history.

(56) References Cited

U.S. PATENT DOCUMENTS

| 2,206,024 | A | * | 7/1940 | Brown ........................ 435/165 |
| 2,216,904 | A | | 10/1940 | Brown |
| 2,216,905 | A | | 10/1940 | Brown et al. |
| 2,263,608 | A | | 11/1941 | Brown |
| 2,446,913 | A | | 8/1948 | Erlich |
| 2,524,718 | A | * | 10/1950 | Stark et al. ................. 426/417 |
| 2,663,718 | A | * | 12/1953 | Strezynski ................. 554/177 |
| 3,721,568 | A | | 3/1973 | Wilson |
| 3,950,230 | A | | 4/1976 | Greenfield et al. |
| 4,407,955 | A | * | 10/1983 | Muller et al. ................ 435/161 |
| 4,944,954 | A | | 7/1990 | Strop et al. |
| 5,250,182 | A | | 10/1993 | Bento et al. |
| 5,269,947 | A | * | 12/1993 | Baskis ........................ 210/774 |
| 5,316,782 | A | | 5/1994 | Zimlich, III |
| 5,662,810 | A | | 9/1997 | Willgohs |
| 5,801,140 | A | | 9/1998 | Langley et al. |
| 5,958,233 | A | | 9/1999 | Willgohs |
| 5,998,641 | A | | 12/1999 | Ganguli et al. |
| 6,146,645 | A | | 11/2000 | Deckers et al. |
| 6,433,146 | B1 | | 8/2002 | Cheryan |

(Continued)

OTHER PUBLICATIONS

Singh, et al., "Extraction of Oil from Corn Distillers Dried Grains with Solubles", 1998, Transactions of the ASAE, Bol. 41(6), pp. 1175 and 1176.*

(Continued)

*Primary Examiner*—Porfirio Nazario Gonzalez
*Assistant Examiner*—Yate' K Cutliff
(74) *Attorney, Agent, or Firm*—Cantor Colburn LLP

(57) ABSTRACT

A method is provided for recovering oil from stillage including oil resulting from a process used for producing ethanol. In one embodiment, the method includes heating the stillage to a temperature sufficient to at least partially separate, or unbind, the oil therefrom The method further includes recovering the oil from the stillage.

11 Claims, 10 Drawing Sheets

U.S. PATENT DOCUMENTS

| | | |
|---|---|---|
| 6,761,914 B2 | 7/2004 | Deckers et al. |
| 2003/0093832 A1 | 5/2003 | Szarka et al. |
| 2003/0180415 A1 | 9/2003 | Stiefel et al. |
| 2004/0081654 A1 | 4/2004 | Schryvers et al. |
| 2004/0082044 A1 | 4/2004 | Prevost et al. |
| 2004/0087808 A1* | 5/2004 | Prevost et al. .................. 554/9 |

OTHER PUBLICATIONS

Yokoyama, et al. "Liquid Fuel Production from Ethanol Fermentation Stillage" 1986, The Chemical Society of Japan, pp. 649-652.*

Minowa, T. et al., Oil Production form Buchwheat Stillage by Thermochemical Liquefactional, 1993, national Inst. for Resources and Environment, Ibaraki (Japan), STN, Abstract, NTIS database.*

N. Singh and M. Cheryan, Extraction of Oil from Corn Distillers Dried Grains with Solubles, Transactions of the ASAE, 1998, pp. 1775-1777, vol. 41(6).

Y. Dote et al., Liquefaction of Stillage from Ethanolic Fermentation and Upgrading of Liquefied Oil, Trans. Mat. Res. Soc. Jpn., 1994, pp. 285-288, vol. 18A.

"Disk Stack Centrifuge Technology," Alfa Laval website, www.alfalaval.com, Aug. 3, 2004, 9 pgs.

Minowa, T., et al. "Oil Production from Buckwheat Stillage by Thermochemical Liquefactional" 1999, National Inst. for Resources and Environment Ibaraki (Japan), STN, Abstract, NTIS database.

(No Author Available) "Thermochemical Liquefaction" article by Wisconsin Biorefining Development Initiative, www.wisbiorefine.org. p. 1-4, undated, (Energy Center of Wisconsin, copyright 2004).

Alfa Laval, "NS 934 DD Decanter," PFT00017EN 0207, PFT00018EN 0207, PFT0007EN 0207, 6 pgs.

International Search Report mailed Aug. 20, 2008.

* cited by examiner

METHOD OF FREEING THE BOUND OIL PRESENT IN WHOLE STILLAGE AND THIN STILLAGE

This application is a continuation of International Application PCT/US07/62301, filed Feb. 16, 2007, which claims the benefit of U.S. Provisional Patent App. Ser. No. 60/773,947, filed Feb. 16, 2006, the disclosures of which are both incorporated by reference.

COPYRIGHT STATEMENT

A portion of the disclosure of this document contains material subject to copyright protection. No objection is made to the facsimile reproduction of the patent document or this disclosure as it appears in the Patent and Trademark Office files or records, but any and all rights in the copyright(s) are otherwise reserved.

TECHNICAL FIELD

The present invention relates generally to recovering oil from corn and, more particularly, to recovering oil by freeing the bound oil present in byproducts of a process used to produce ethanol.

BACKGROUND OF THE INVENTION

Over the past thirty years, significant attention has been given to the production of ethyl alcohol, or "ethanol," for use as an alternative fuel. Ethanol not only burns cleaner than fossil fuels, but also can be produced using corn, a renewable resource. At present, more than sixty-nine "dry milling" plants in the United States produce billions of gallons of ethanol per year. Additional plants presently under construction are expected to add hundreds of millions gallons to this total in an effort to meet the current high demand.

As noted in the foregoing discussion, a popular method of producing ethanol from corn is known as "dry milling." As is well known in the industry, the dry milling process utilizes the starch in the corn to produce the ethanol through fermentation, and creates a waste stream comprised of byproducts termed "whole stillage" (which may be further separated into products commonly referred to as "distillers wet grains" and "thin stillage"). Despite containing valuable oil, these byproducts have for the most part been treated as waste and used primarily to supplement animal feed. This feed is mostly distributed in the form of distillers dried grains with solubles, which is created by evaporating the thin stillage, recombining the resulting concentrate or syrup with the distillers wet grains, and drying the product to have a moisture content of less than about 10% by weight.

Efforts to recover the valuable oil from these byproducts have not been successful in terms of efficiency or economy. For example, one approach involves attempting to separate the oil from the thin stillage before the evaporation stage, such as using a centrifuge. However, spinning the thin stillage at this stage does not produce usable oil, but rather merely creates an undesirable emulsion phase requiring further processing. Moreover, the volume of thin stillage is generally 2 to 10 times greater than the syrup, and thus involves a considerable capital requirement to purchase the number of centrifuges required. Together, these obstacles make attempts to recover oil from corn thin stillage prior to evaporation highly inefficient and uneconomical.

U.S. Pat. No. 5,250,182 (the disclosure of which is incorporated herein by reference) describes the use of filters for removing substantially all solids and recovering lactic acid and glycerol from the thin stillage without the need for evaporation. Despite eliminating a step in the conventional process, the proposal results in a more complicated arrangement requiring multiple filtration steps. Wholesale elimination of the evaporator in the vast majority of existing plants is also unlikely and otherwise uneconomical. Filters, and especially the microfiltration and ultrafiltration types proposed for use in this patent, are also susceptible to frequent plugging and thus deleteriously increase the operating cost. For these reasons, the filtration process proposed in this patent has not gained widespread commercial acceptance.

Accordingly, a need exists for more efficient and economical manners of recovering oil from byproducts created during the production of ethanol.

SUMMARY OF THE INVENTION

In one aspect of the invention, a method of recovering oil from stillage including oil resulting from a process used for producing ethanol is provided. The method comprises heating the stillage to a temperature sufficient to at least partially separate the oil therefrom. The method further comprises recovering the oil from the stillage.

In one preferred embodiment, the heating step comprises heating to a temperature above 212° F. and the method further includes the step of pressurizing the heated stillage to prevent boiling. More preferably, the heating step comprises heating to a temperature of about 230° F., but less than about 250° F. In any case, the pressurizing step preferably includes maintaining a pressure on the stillage of at least a vapor pressure necessary to allow the stillage to reach the desired temperature for separating at least part of the oil without boiling the stillage. Most preferably, the method includes the step of allowing the stillage to return to atmospheric pressure after the heating and pressurizing steps but before the recovering step.

In the foregoing or other embodiments, the recovering step comprises separating the oil from the stillage using gravity separation. Preferably, the step of using gravity separation includes passing the stillage through a centrifuge or delivering the stillage to a settling tank.

In still other embodiments, the heating step comprises passing the stillage through at least two heat exchangers in series. The method may further include the step of cooling the stillage after the heating step and before the recovering step. Preferably, the cooling step comprises cooling the stillage to a temperature of less than 212° F. It is also preferable for the method to include the step of elevating the pressure of the stillage to above atmospheric pressure prior to the heating step. In any case, the method may further include the step of cooling the stillage and allowing the stillage to return to atmospheric pressure prior to the recovering step. Alternatively, the method may further include the step of elevating the pressure of the stillage to above atmospheric pressure prior to the heating step and recovering oil from the stillage at the elevated pressure.

In accordance with another aspect of the invention, a system is provided for recovering oil from pressurized stillage resulting from a process used for producing ethanol. The system comprises a first heater for receiving and superheating the pressurized stillage. The system further comprises a separator downstream of the first heater for recovering oil from the stillage.

In one preferred embodiment, a second heater preheats the pressurized stillage before delivery to the first heat exchanger. More preferably, at least one of the first and second heaters comprises a wide gap plate and frame heat exchanger and the other is a scraped surface shell and tube heat exchanger. The first heater may comprise at least two heat exchangers.

In this or another embodiment, the separator comprises a gravity separator. Preferably, the gravity separator comprises a centrifuge or a settling tank. The separator may also comprise a hermetically sealed centrifuge.

According to a further aspect of the invention, a system for recovering oil from thin stillage resulting from a process used for producing ethanol is disclosed. The system comprises an evaporator for concentrating the thin stillage to form a syrup. A pump is also provided for elevating the pressure of the syrup to above atmospheric pressure. A first heater receives and pre-heats the pressurized syrup, and a second heater receives and superheats the pre-heated pressurized syrup. A separator downstream of the second heater recovers oil from the syrup.

Preferably, the first heater comprises a wide gap plate and frame heat exchanger and the second heater is a scraped surface shell and tube heat exchanger. Likewise preferable is for the second heater to comprise at least two heat exchangers. The separator preferably is a gravity separator, such as a centrifuge or a settling tank. The separator may also comprise a hermetically sealed centrifuge.

Still another aspect of the invention is a method of recovering oil from concentrated stillage including oil resulting from a process used for producing ethanol. The method comprises pressure cooking the stillage to unbind the oil, and then recovering the unbound oil. Preferably, the method further includes concentrating the stillage prior to the pressure cooking step.

Yet another aspect of the invention is a method of a method of recovering oil from stillage including oil resulting from a process used for producing ethanol. The method comprises hydrolyzing solids in the stillage, concentrating the stillage, and recovering the oil from the stillage. The hydrolyzing step makes the oil available for recovery and reduces viscosity during the concentrating step.

In one embodiment, the step of hydrolyzing solids in the stillage includes heating the stillage. Preferably, the heating is to a temperature greater than 212° F. and is done under a pressure greater than atmospheric pressure. Most preferably, the method includes cooling the stillage before recovering oil.

In this or another embodiment, the concentrating step comprises evaporating the stillage after the hydrolyzing step, such as by using a scraped surface heat exchanger. The recovering step may comprise using gravity separation.

Preferably, the stillage comprises whole stillage, and the method further includes the step of obtaining thin stillage from the whole stillage after the step of hydrolyzing solids. Still more preferably, the method includes the step of obtaining thin stillage from the whole stillage, and the step of hydrolyzing solids is performed on the thin stillage. Most preferably, the method further includes the step of obtaining thin stillage from the whole stillage and the step of concentrating the thin stillage before the step of hydrolyzing solids.

In accordance with yet another aspect of the invention, a system for of recovering oil from pressurized whole stillage resulting from a process used for producing ethanol is provided. The system comprises a first heater for receiving and superheating the pressurized whole stillage, a decanter for obtaining thin stillage from the whole stillage, an evaporator for concentrating the thin stillage, and a separator downstream of the first heater for recovering oil from the thin stillage. The system may further include a second heater upstream of the evaporator for receiving and superheating the pressurized thin stillage, as well as a heat exchanger downstream of the evaporator for further concentrating the thin stillage. A dryer may also be provided downstream of the separator for receiving a byproduct leftover upon recovering oil from the thin stillage.

DETAILED DESCRIPTION OF THE INVENTION

One aspect of the invention relates to a method of recovering oil from a byproduct resulting from the production of ethanol from corn, such as by using a dry milling technique (which is extensively described in the above-referenced '182 patent). This byproduct, known as "thin stillage," is recovered by separating the distillers wet grain from the "whole stillage" leftover after fermentation is complete. As is known in the art, tis mechanical separation may be accomplished using a press/extruder, a decanter centrifuge (also simply known as a "decanter"), or a screen centrifuge. Moisture is then removed from the unfiltered thin stillage to create a concentrate or syrup, such as through evaporation. Usable oil is then easily recovered from this concentrate through mechanical processing, without the prior need for multiple stages of filtration or other expensive and complicated forms of processing.

In one embodiment, oil is recovered from the concentrate by passing it through a centrifuge and, in particular, a disk stack centrifuge (and, most preferably, a self-cleaning bowl type). Preferably, the concentrate delivered to the disk stack centrifuge is at a temperature of between about 150 and 212° F. (and ideally 180° F.), a pH of between about 3 and 6 (ideally between about 3.5 and 4.5) and, as a result of the preceding evaporation step, has a moisture content of less than about 90% (ideally about 60-85%). Under these process conditions, the disk stack centrifuge is able to separate the oil in usable form from the concentrate in an efficient and effective manner, despite the relatively high level of solids present (which may be recovered from the centrifuge in a continuous or intermittent fashion, depending on the particular process conditions).

Besides creating usable oil, the concentrate or syrup recovered from the disk stack centrifuge is considered more valuable. This is because the post-evaporation processing to remove the oil improves the efficiency of the drying process used on the combined concentrate syrup and distillers wet grains. A stable, flowable product for supplementing animal feed results, which thus further complements the value of the oil recovered.

To illustrate the potential benefits that may be obtained by this aspect of the invention, the following examples are presented.

EXAMPLE 1

Figure 1:
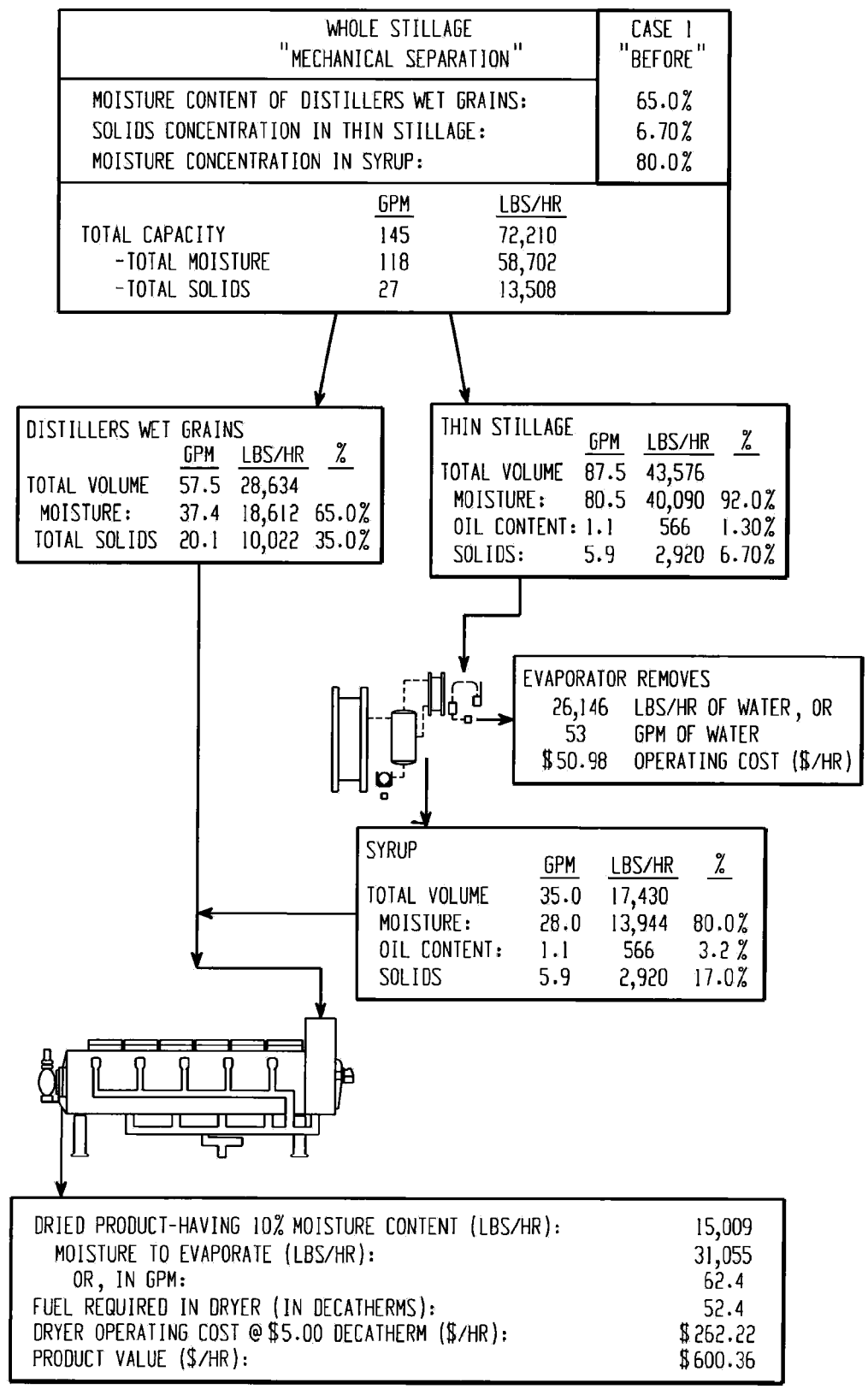
FIG. 1 is a partially schematic flow chart illustrating the processing of co-products formed during the ethanol extraction process.
Figure 2:
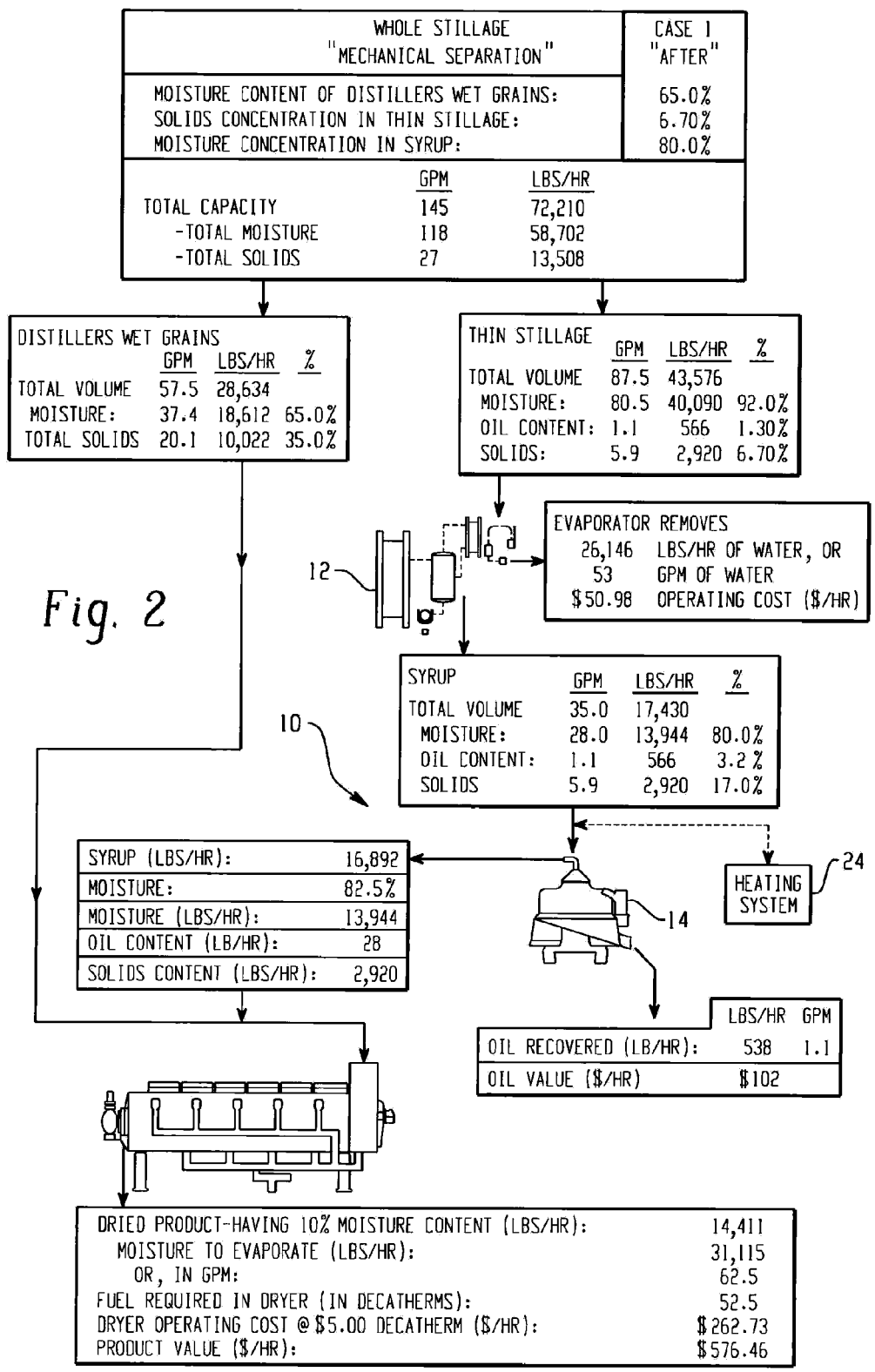
FIG. 2 is a partially schematic flow chart illustrating the recovery of oil from a syrup formed by evaporating the thin stillage.

Reference is made to FIGS. 1 and 2 to illustrate schematically a first example demonstrating the efficacy of the present method. FIG. 1 represents one technique for processing whole stillage to create distillers dried grains with solubles. The whole stillage leftover after deriving the ethanol is mechanically separated into distillers wet grains (approx. 35% solids) and thin stillage (approx. 8% solids) using a centrifugal decanter. The thin stillage is then introduced to an evaporator to create a concentrate, or syrup, having a moisture content of approximately 80% and about 17% solids. This syrup is then recombined with the distillers wet grains, introduced to a drum dryer, and dried to reduce the overall moisture content to approximately 10%. At present, an estimated total value of the resulting distillers dried grains with solubles is $600.36 per hour.

FIG. 2 represents the inventive method and a related subsystem 10 for implementing it. Initial processing of the whole stillage is done in the same fashion, and the mechanically separated thin stillage is delivered to the evaporator 12 forming part of the subsystem 10. The resulting concentrate or syrup having a moisture content of approximately 80% and a solids content of approximately 17% is delivered to a disk stack centrifuge 14, such as an Alfa Laval Model No. 510, 513, or 617 or equivalent device. At an infeed rate of approximately 35 gallons per minute, this centrifuge 14 recovers usable oil at a rate of 538 pounds per hour and produces syrup having a having a moisture content of 82.5%, but with far less oil in view of the preceding recovery step.

Recombining the syrup (which is substantially free of oil) from the centrifuge 14 with the distillers wet grains and drying in a drum dryer to a moisture content of 10% results in a product having a value of $576.46 per hour. However, the 538 pounds per hour of oil recovered has a product value of approximately $102 per hour. Accordingly, the total product value using the inventive method is $678.46 per hour, which is approximately 12% greater than the $600.36 per hour product value resulting from use of the conventional set-up shown in FIG. 1. Moreover, removal of the majority of the oil before the drying step makes the process more efficient, and results in an estimated energy savings of approximately 10%, or $26.27 per hour. As a result, product value per hour ($678.46) less the estimated dryer operating cost ($236.46 per hour with the 10% savings) and less the estimated evaporator operating cost ($50.98 per hour) is about $391.02 per hour.

EXAMPLE 2

Figure 3:
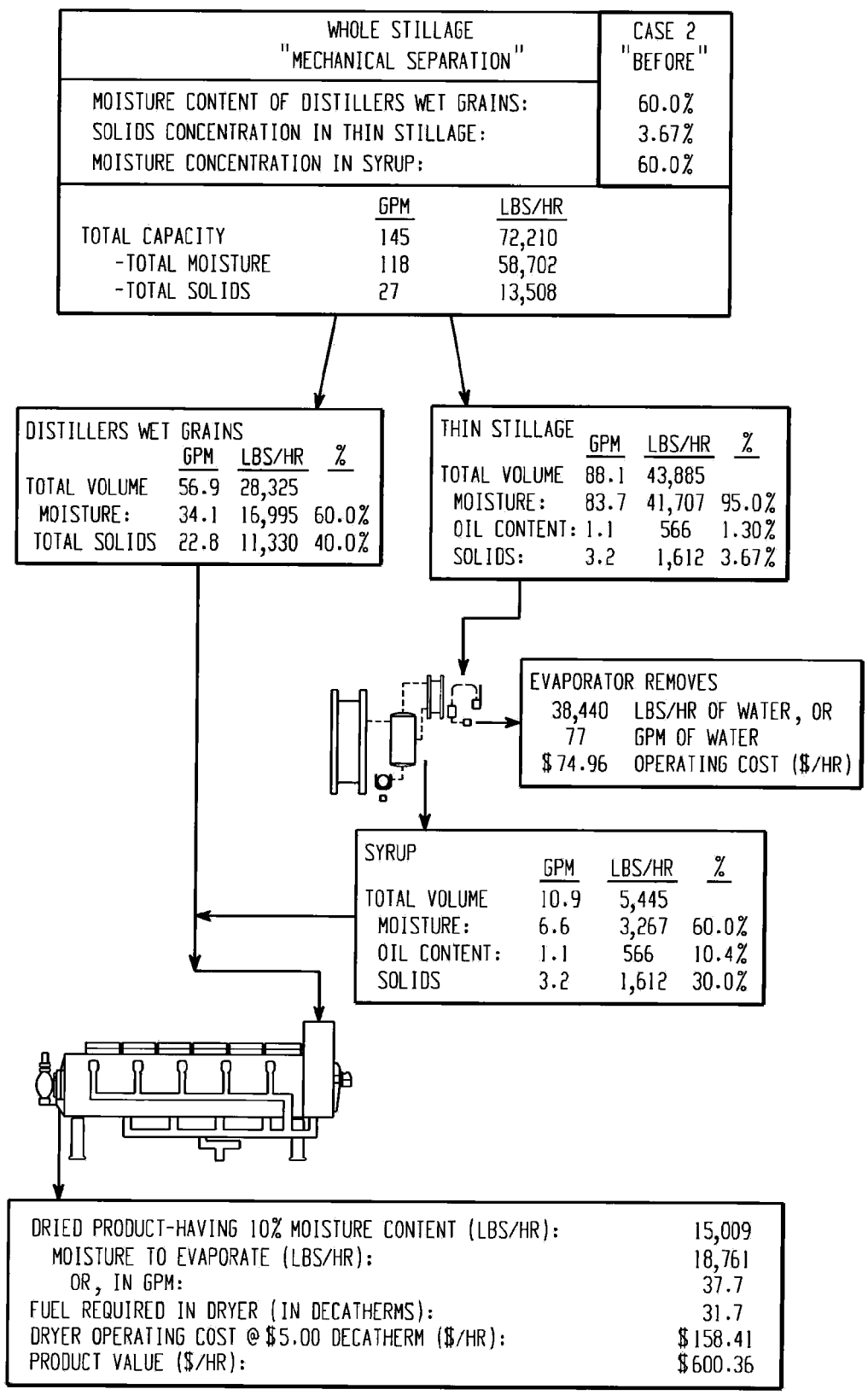
FIG. 3 is a schematic view similar to FIG. 1.
Figure 4:
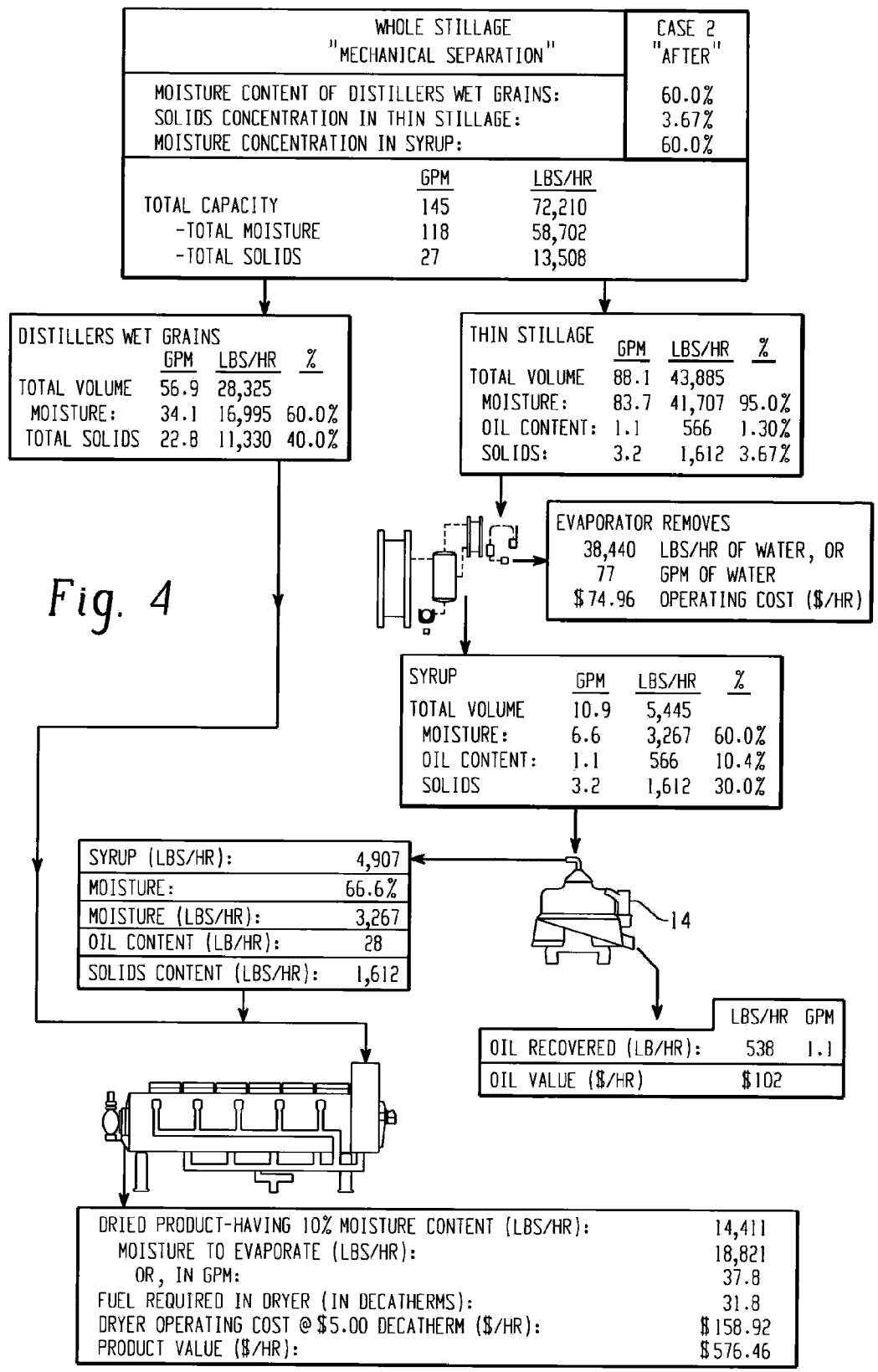
FIG. 4 is a schematic view similar to FIG. 2.

Reference is made to FIGS. 3 and 4, which illustrate a prophetic comparison between one processing method and the inventive method. The set-up is essentially the same as shown in FIGS. 1 and 2, but a more effective centrifugal decanter is used than the one used in Example 1. As a result, the syrup introduced to the disk stack centrifuge would have a moisture content estimated at 60%. While this does not impact the product value figures, the syrup delivered from the disk stack centrifuge 14 has a moisture content of only 66.6%, as compared to 82.5% in Example 1. As a result, the cost per hour of drying this syrup when combined with the distillers wet grains to achieve an end product having a moisture content of less than 10% is only $158.92, or approximately 40% less. Assuming a savings in dryer efficiency of 10%, the product value per hour ($678.46) less the estimated dryer operating cost ($143.03 per hour) and less the estimated evaporator operating cost ($74.96 per hour) is $460.46 per hour. This represents an approximate 15% increase over the corresponding value calculated in Example 1.

Figure 5:
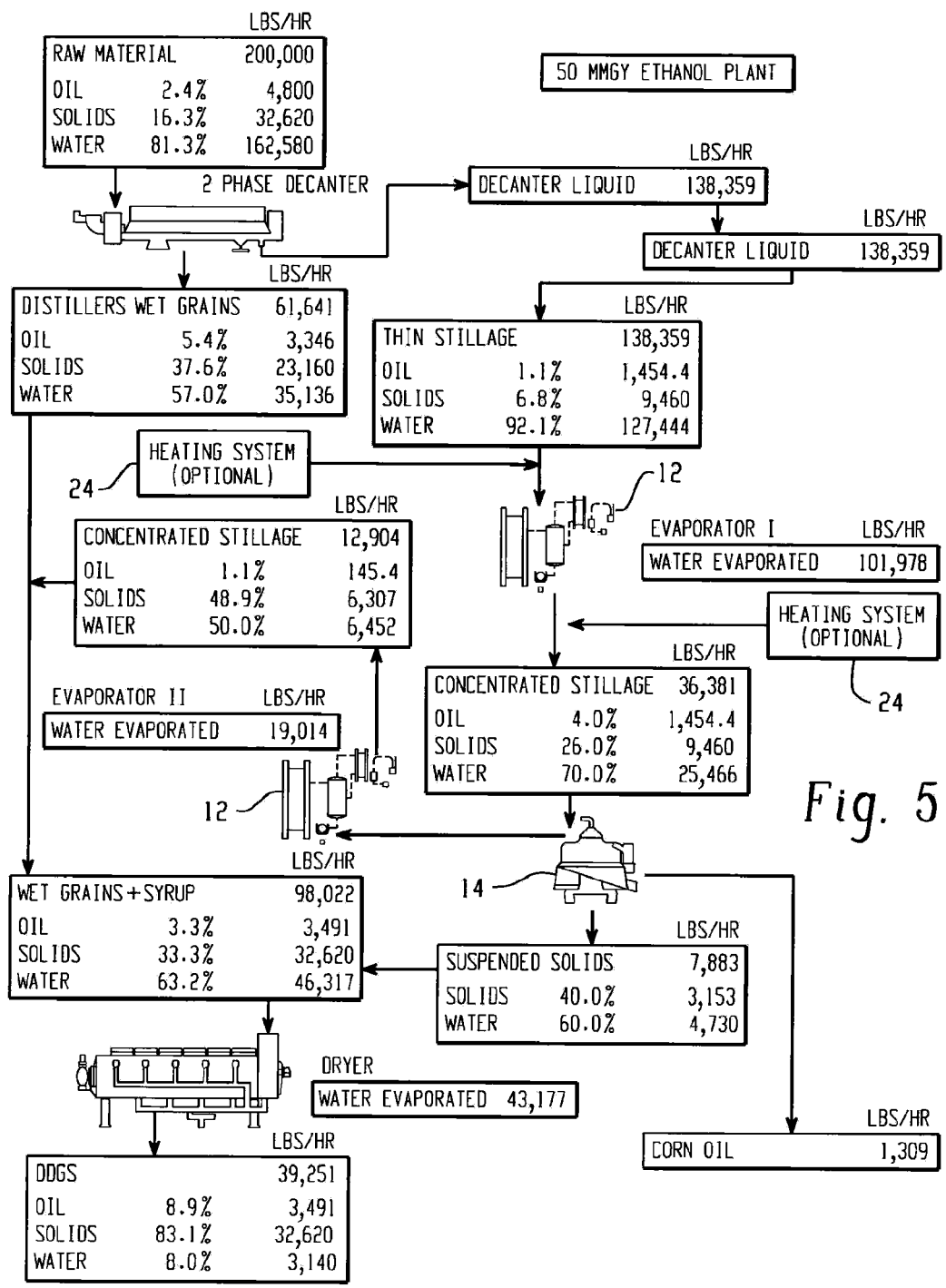
FIG. 5 is a schematic flow chart illustrating the strategic positioning of a separator relative to the evaporation of thin stillage.

In accordance with a further aspect of the invention, another method of recovering oil from the thin stillage is disclosed. As shown in FIG. 5, this embodiment is similar to the one described above in that the thin stillage is passed through a centrifuge 14 and, in particular, a disk stack centrifuge (such as, for example, an Alfa Laval AFPX 513 or AFPX 617) to recover valuable corn oil. The process conditions used may be similar or identical to those already described.

Besides creating corn oil, the disk stack centrifuge 14 also produces byproducts, including suspended solids (or "sludge") and syrup (which were collectively referred to above as "syrup" for purposes of convenience). This syrup byproduct may be further concentrated, such as by using an evaporator, to thus minimize the amount of moisture in it (in the example, to about 50%). The resulting "concentrated stillage" may then be delivered to the dryer along with the distillers wet grains and suspended solids obtained from the centrifuge 14. Since an evaporator 12 is generally considered more efficient than a drum dryer, the overall efficiency of the process improves as a result (possibly as much as 25%, depending on the performance of the centrifuge 14 and evaporator 12).

A related aspect involves the strategic positioning of the centrifuge 14 relative to the evaporator 12, which may be comprised of multiple stages. In particular, a typical multi-stage evaporator 12 used in an ethanol plant includes eight (8) successive stages, with each stage further concentrating the syrup by removing moisture. Installing the centrifuge 14 prior to the last stage (e.g., at the seventh stage or earlier) may further enhance the efficiency of the process (which is considered an ancillary benefit, since the primary benefit of achieving oil recovery is accomplished regardless of this aspect). The remaining concentrate (syrup) may then be further concentrated, such as using the remaining stages of the evaporator or a different evaporator.

Primarily, this strategic positioning is beneficial because the centrifuge 14 removes suspended solids, which are most responsible for fouling the corresponding heat exchangers of the evaporator 12. A side benefit is that the centrifuge 14 may be better able to extract the corn oil from the thin stillage at the lesser solids concentrations associated with the earlier stages of the evaporation process. Adding the centrifuge 14 before the last stage also maximizes evaporator usage, which can result in a significant reduction in energy costs (perhaps as much as $500,000 annually for a 50 mmgy ethanol plant).

In practice, the evaporators 12 in many ethanol plants are already "at capacity." In such cases, it may be necessary to add evaporator capacity to maximize the benefit of removing the suspended solids using the centrifuge 14 (which, again, is a benefit in addition to that afforded by the recovery of valuable oil from a previously less-valuable byproduct: thin stillage). This can be accomplished by: (1) increasing the size of the final stage(s) of the evaporator; (2) adding additional stages;

or (3) adding a separate, "stand alone" evaporator (which may include shell and tube, plate and frame, or scraped surface heat exchangers).

Yet another process useful in connection with recovering oil from corn byproducts is now described with reference to FIGS. 6-8. In this aspect of the invention, the leftover whole stillage is "washed" prior to undergoing further processing. "Washing" animal protein products involves heating to liberate the oil contained therein, mixing in water, and then recovering the oil-laden liquid (termed "wash water"), which may then undergo further separation. The remaining "wet" defatted protein solids are then used in food products for animal consumption (including humans).

Figure 6:
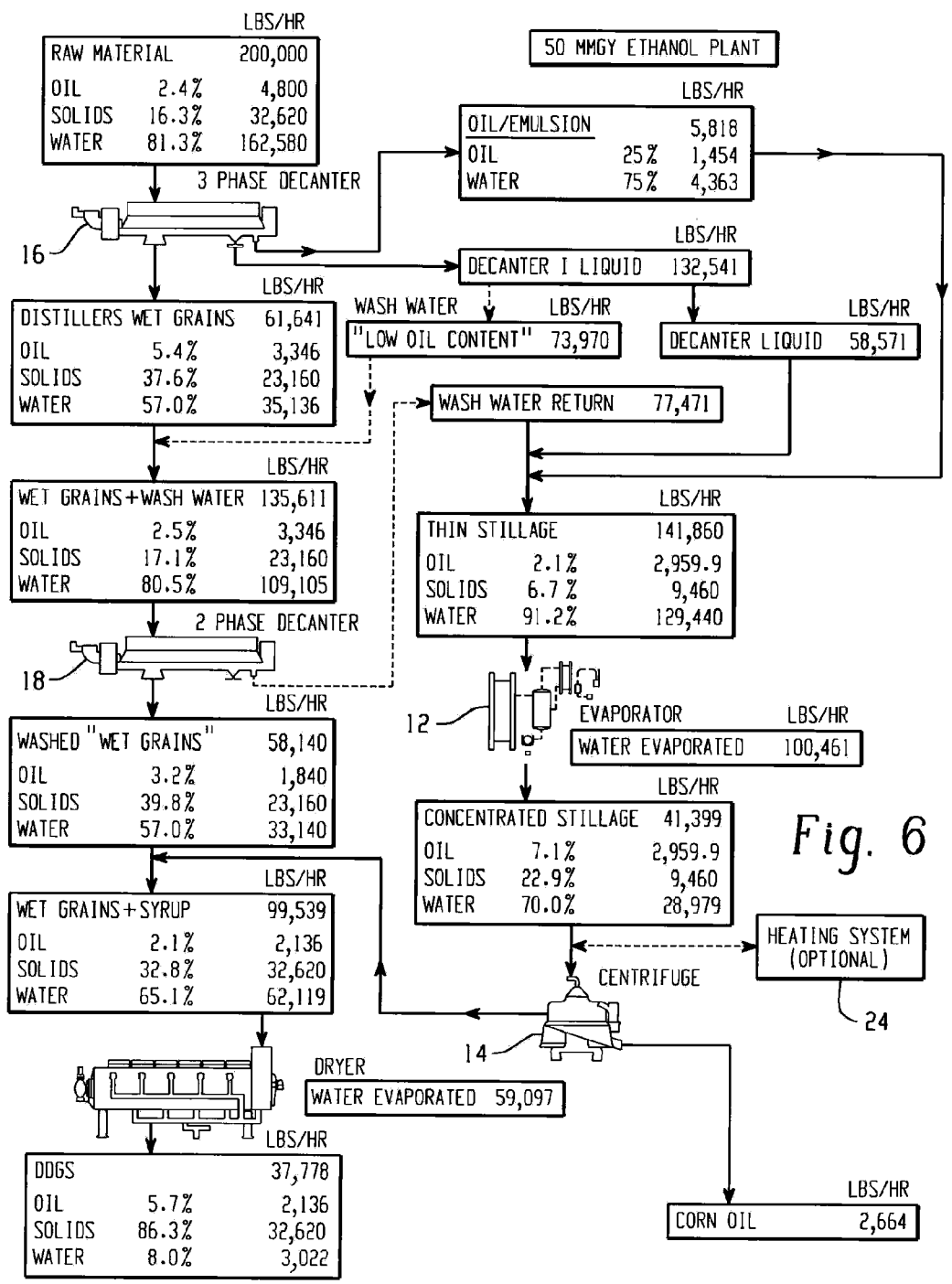
FIG. 6 is a schematic flow chart illustrating one technique and system for washing whole stillage to maximize oil recovery.

In one embodiment, as shown in FIG. 6, this process involves using a three phase decanter 16 that splits the raw material into three phases: a solids (heavy) phase, a water (intermediate) phase, and an oil (light) phase (typically in the form of an emulsion). The oil phase and the intermediate phase together are essentially the thin stillage, which may be evaporated and passed through a centrifuge 14 to recover valuable oil, on the one hand, and distillers wet grains and syrup on the other.

A portion of the liquid phase from the decanter can be used as the wash water. If using a three phase decanter 16 as described in FIG. 6, this wash water will have a lower oil content that typical stickwater and thus may allow from higher oil removal during washing. If using a two phase decanter (as shown in FIGS. 7 and 8 and described below), a portion of the decanter liquid (thin stillage) can also be used as wash water.

The oil content is very low in thin stillage and de-fatting it as is done in animal processing prior to washing is not necessary. For example, in animal processing, the decanter liquid has an oil content of 20% to 50% and thus cannot be used as wash water without first de-fatting it in a centrifuge (or other oil removal technique). Preferably, the wash water is at or below 1.5% oil content. As seen in FIG. 5, the thin stillage from ethanol is at 1.1% oil content and suitable for wash water without any oil removal (see also FIGS. 7 and 8, where two phase decanters are used).

In any case, this wash water is recombined with the distillers wet grains (which still contain roughly two-thirds of the oil present in the whole stillage). In the illustrated embodiment, the wash water and wet grains are then together fed to a downstream two phase decanter 18. The output is "washed" distillers wet grains and wash water. The oil-laden wash "water" from the second decanter 18 is then recombined with the decanter liquid and oil phase recovered from the three phase decanter 16. Together, this combination forms the thin stillage that is then concentrated and separated into syrup, suspended solids, and usable oil by the centrifuge 14.

As an adjunct to this aspect of the invention, the "leftover" syrup obtained from the centrifuge 14 may be further evaporated, as described above, combined with the "washed" wet grains, and then dried. For the exemplary 200,000 lbs/hour input proposed in the arrangement shown in FIG. 6, the result may be the production of 2,664 lbs/hour of corn oil with a value of $399.59/hour and 37,778 lbs/hr of distillers dried grain solubles having a moisture content of 8.0% and a value of $1,322.24/hour. The total operating cost is $815.55/hour, and the total product value is thus $1,721.83/hour.

Compare these figures with those provided in FIG. 5, in which a corresponding input of whole stillage produces 1,309 lbs/hour of corn oil having a value of $196.34/hour and 39,251 lbs/hr of distillers dried grain solubles having a moisture content of 8.0% and a value of $1,373.79/hour. This processing also has an estimated operating cost of $722.22/hour and a product value of $1,570.13 per hour. The net figures are $847.91 for the arrangement shown in FIG. 5, and $906.28 for the one of FIG. 6, which is an approximate 6% gain per hour. In sum, the recovery of valuable oil using the technique illustrated in FIG. 6 is more than doubled for every hour of processing (2,664/1,309=2.03), which is expected since approximately half of the oil otherwise remaining in the wet grains (which is about two thirds of the total) is now being recovered.

Figure 7:
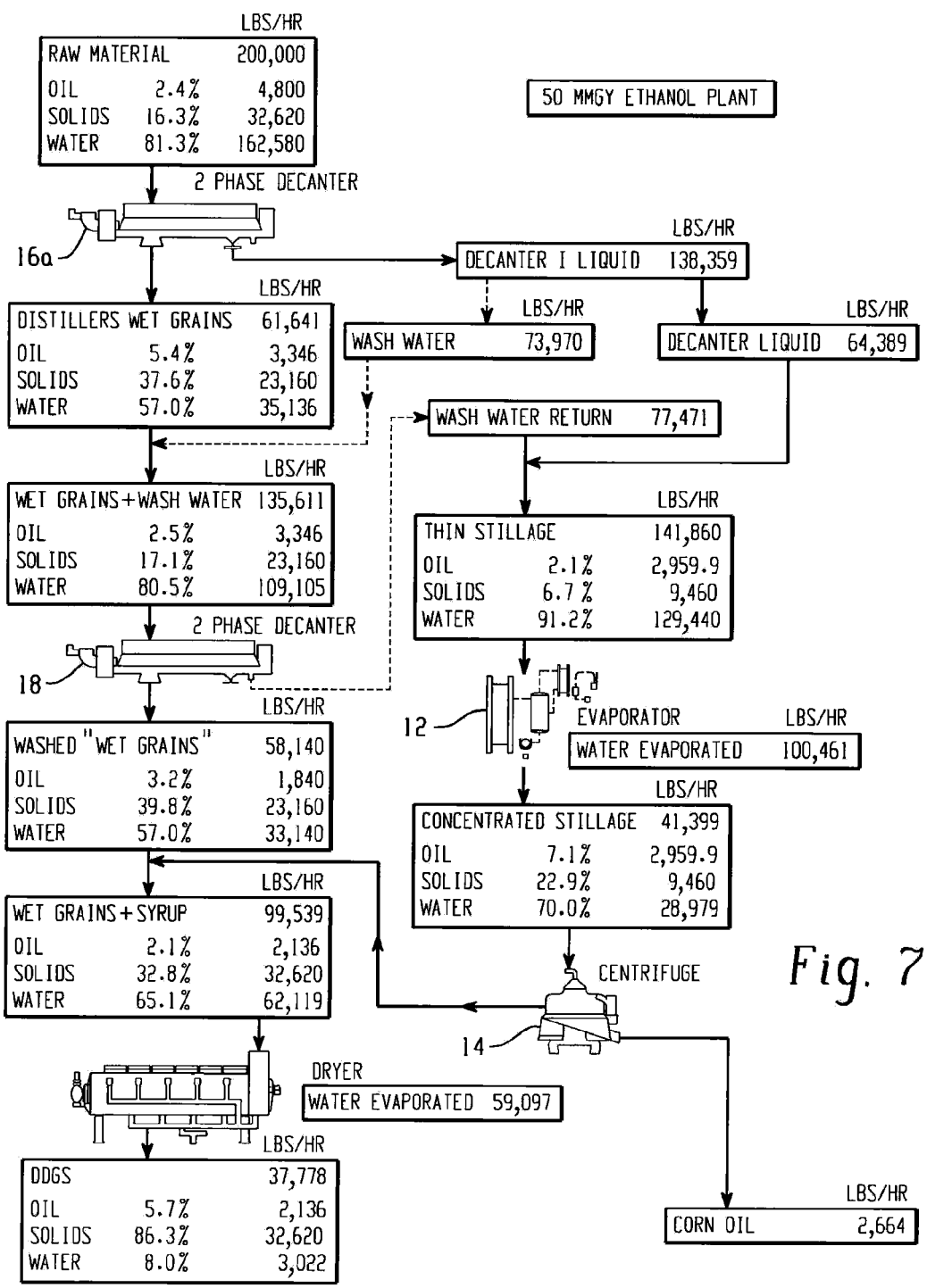
FIG. 7 is a schematic flow chart illustrating another technique and system for washing whole stillage to maximize oil recovery.

FIG. 7 shows an alternate embodiment in which a two phase decanter 16a is used instead of the three phase one. From the "raw material" (whole stillage), the two phase decanter 16a produces distillers wet grains (essentially, the solid phase) and a liquid phase, which may again be separated into the wash water and the decanter liquid. If separated, the wash water from decanter 16a may then be processed along with the distillers wet grains as described above, including using a second two phase decanter 18. The wash water return from this second decanter 18 may be combined with the decanter liquid phase from the first decanter 16a to create the thin stillage. The thin stillage is then evaporated and separated into valuable oil and syrup (including suspended solids). The syrup is combined with the washed wet grains from the second decanter 18 and dried. This produces the same total value per hour number as the arrangement shown in FIG. 6, but at a slightly lower operating cost because only two phase decanters 16a, 18 are used.

Figure 8:
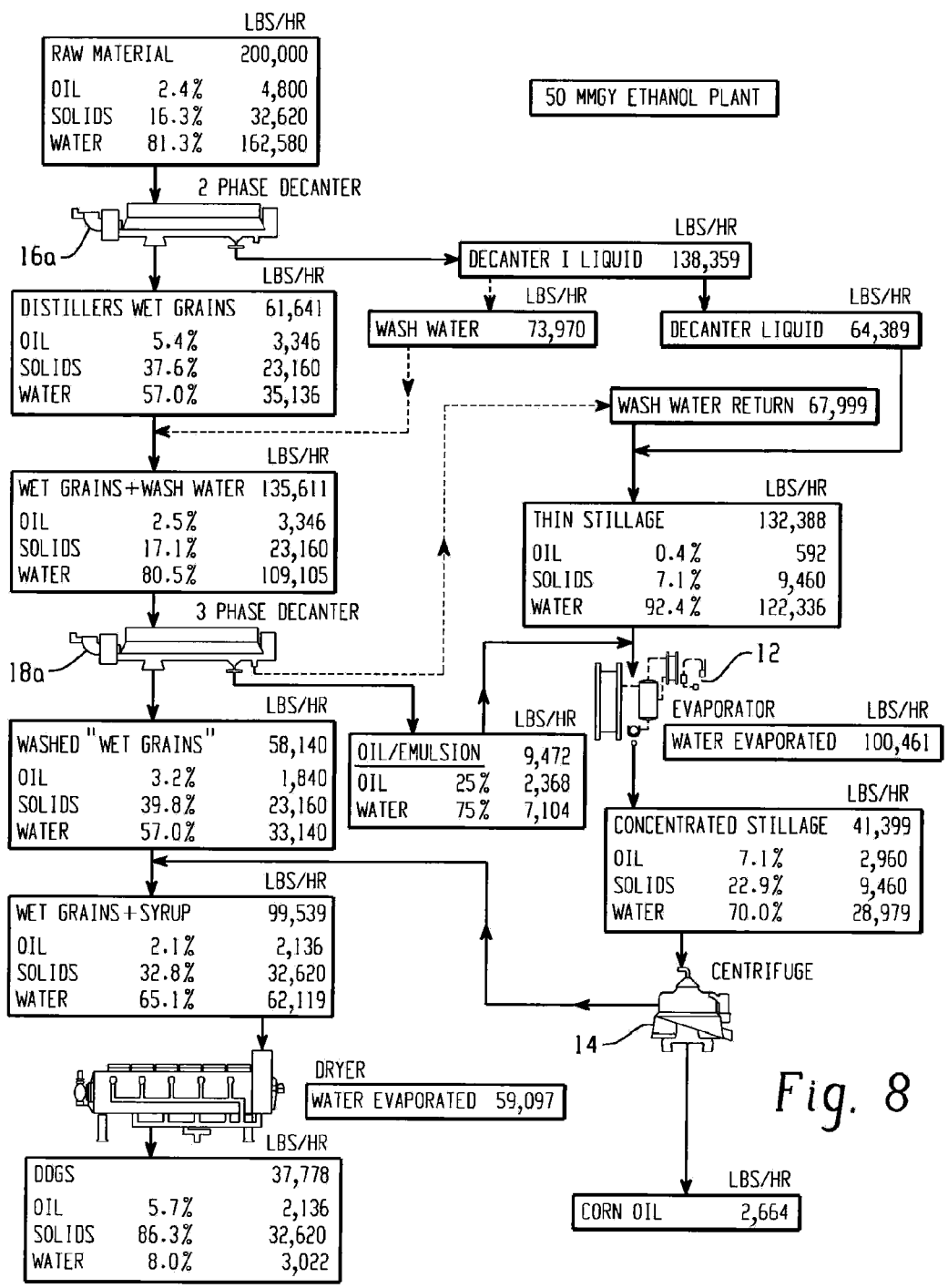
FIG. 8 is a schematic flow chart illustrating yet another technique and system for washing whole stillage to maximize oil recovery.

FIG. 8 shows yet another possible approach similar to the one in FIG. 6, but the positions of a two phase decanter 16a and three phase decanter 18a are switched. The oil/emulsion phase and wash water from the three phase decanter 18a is then mixed with the thin stillage prior to evaporation and separation. The resulting syrup is then mixed with the "washed" wet grains and dried. This produces the same total value per hour number as the arrangement shown in FIGS. 6 and 7 at a comparable operating cost.

Still another aspect of the invention is a method and system for further enhancing the recovery of oil from byproducts of the dry milling process used to produce ethanol. In particular, this aspect of the invention involves freeing the bound oil present in whole stillage, thin stillage, or concentrated thin stillage by at least heating, and preferably "pressure cooking," prior to any separation step (but not necessarily immediately before it). In essence, the method and system involves elevating the temperature of the particular stillage to at least the boiling point of water (212° F.). More preferable is elevating the temperature above 212° F., and most preferably to within the range of about 230° F.-250° F.

This elevated temperature, and particularly within the range of about 230° F.-250° F., frees substantially all the oil trapped within the stillage that might otherwise not be captured through separation at a lower temperature. In addition, subsequent cooling of the stillage to below the boiling point of water, such as to 210° F. to 190° F. or lower, has no impact on the recovery, since the oil continues to remain free and unbound even after cooling. This separation created by high-temperature processing allows for recovery of the oil from the stillage using less expensive and complicated methods, such as by gravity separation (such as by way of forced gravity (e.g., a centrifuge) or naturally (e.g., a settling tank to allow the free oil to rise to the top for recovery)).

Of course, processing at such elevated temperatures with any byproduct containing any water (e.g., thin stillage) requires elevating the pressure of at least the vapor pressure at the corresponding temperature to keep it from boiling, which is undesirable. This heating without boiling could be done, for example, using a hermetically sealed centrifuge that can receive and process the product under pressure and operate to heat the product under a pressurized condition while the oil is simultaneously unbound, separated, and recovered. However, this type of centrifuge is more expensive to own and operate, so it is preferable in terms of efficiency (but not necessarily required) to keep the temperature at below the boiling point of water during the separation phase.

One possible manner of implementing the method of freeing bound oil in stillage to thereby enhance recovery using less expensive equipment (e.g., a regular centrifuge or settling tank) is to heat the stillage under pressure prior to the separation phase, and preferably in the case of thin stillage after it has been evaporated and concentrated into a syrup. This can be done using any means for pressurizing the syrup (such as a pump) in combination with a heater. Most preferably, the heater includes a series of heat exchangers to preheat and then superheat the stillage to above 212° F. in order to unbind the oil and then cool the stillage down for separation and oil recovery using gravity separators.

Figure 9:
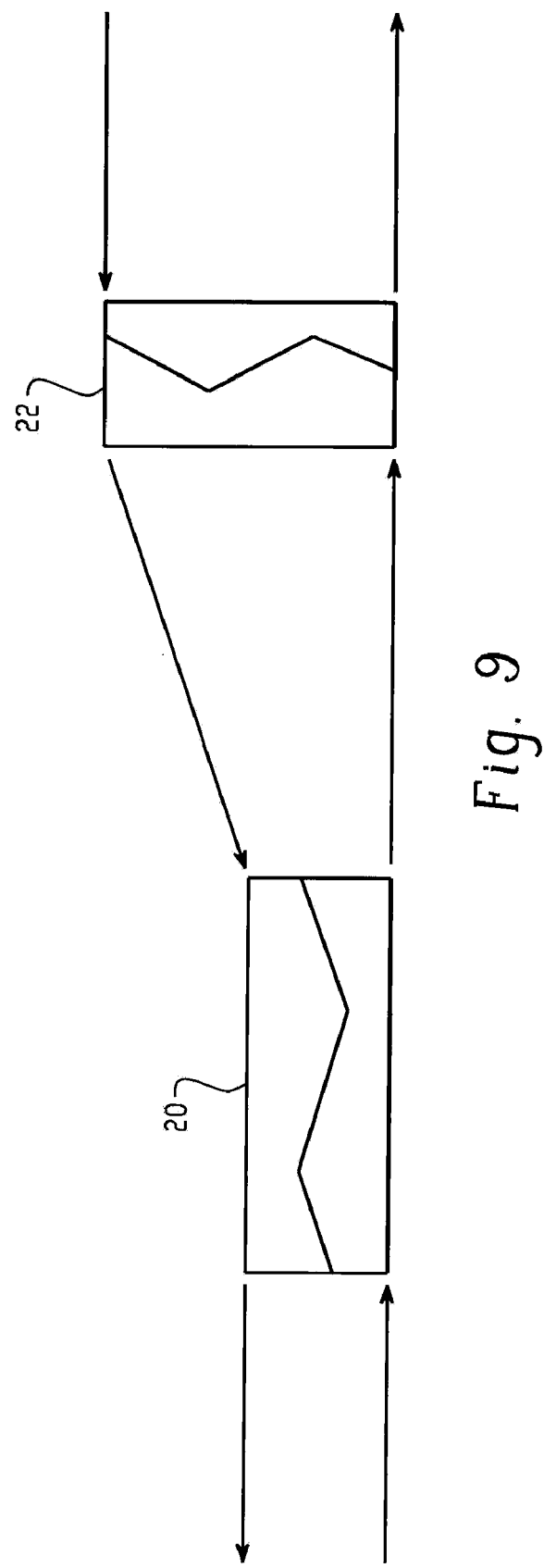
FIG. 9 is a schematic flow chart illustrating a technique and system for the further processing of stillage, such as by superheating or "pressure cooking" to maximize oil recovery.

For example, FIG. 9 is a schematic diagram showing the product (e.g., thin stillage, whole stillage, or syrup formed by concentrating thin stillage) being supplied to a first heater in the form of a heat exchanger 20 at an inlet temperature of approximately 180° F. This first heat exchanger 20 may be of any type suitable for pre-heating the product to a temperature above the inlet temperature, but below the boiling point of water. An example is a "product on product" heat exchanger, such as a wide gap plate and frame heat exchanger made by Alfa Laval.

The pre-heated product exiting the first heat exchanger 20 at an elevated intermediate temperature (e.g., 210° F.), but preferably below the boiling point of water, is then delivered to a second heat exchanger 22 forming the series. This second heat exchanger 22 is adapted for and capable of superheating the product to above the boiling point of water, such as to a temperature of 240° F., so as to free the bound oil. Although any heat exchanger capable of performing this function will work (such as a plate and frame, shell and tube, or even direct steam injection), a preference exists for a scraped surface shell and tube heat exchanger (e.g., an Alfa Laval "Dynamic Heat Exchanger"). In such an arrangement, the tubes are continuously scraped to prevent any build-up and prevent undesirable clogging. On the shell side, a heating fluid such as steam is used to elevate the temperature of the stillage.

Prior to recovering the oil via separation using a less expensive type of gravity separator (i.e., a non-hermetically sealed centrifuge or settling tank), it preferably is cooled. In the illustrated arrangement, this is accomplished by returning the superheated product to the first heat exchanger 20. Passing the superheated product through the same heat exchanger advantageously serves to preheat the product supplied in the desired fashion, while simultaneously cooling the return product using the cooler inlet product.

Figure 10:
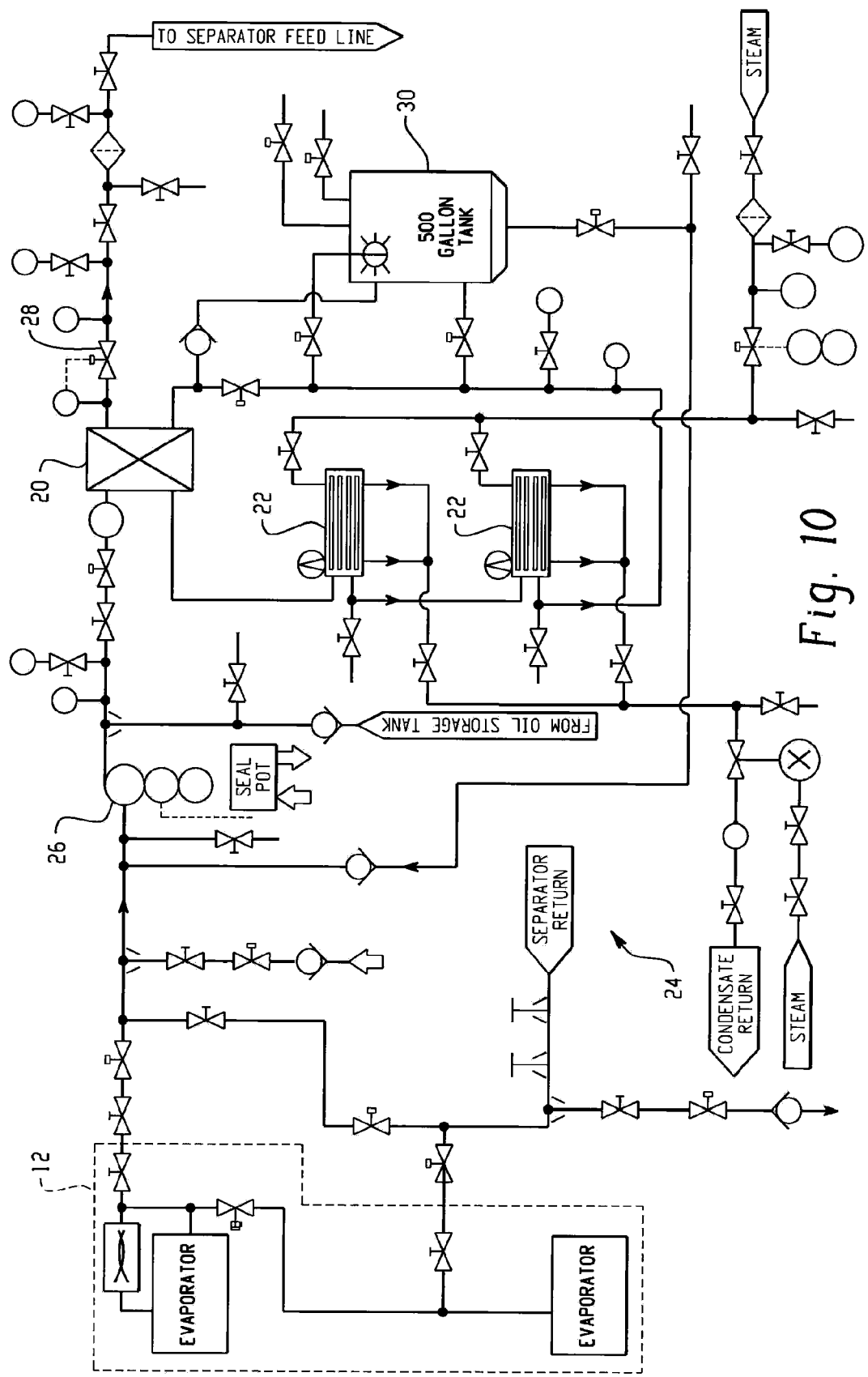
FIG. 10 is a schematic diagram illustrating an overall technique and system for maximizing oil recovery from stillage.

FIG. 10 illustrates an overall system 24 constructed to incorporate the series of heat exchangers 20, 22 described in the foregoing discussion for processing concentrated thin stillage or syrup. A booster pump 26 is used to elevate the concentrated stillage emanating from an upstream evaporator 12 to a pressure of at least approximately 80 psig, which is sufficient to prevent boiling at a temperature above 212° F. The pressurized syrup is then passed to the first heat exchanger 20, and then the second heat exchanger 22 (which is actually comprised of two heaters in series, but could of course be done with a single unit). An associated valve 28 is strategically positioned to ensure that the desired backpressure is maintained within the heat exchanger(s).

Downstream of the valve 28, the return product is released to atmospheric pressure, since it will no longer boil after cooling. An optional pressurized tank 30 may also receive the superheated product, which allows it to remain at an elevated temperature for a given period of time (in the case of a 500 gallon tank, for approximately 5 minutes). This helps to allow the oil in the product to become unbound. The product may then be delivered to a suitable separator for recovering the unbound oil, such as a centrifuge (see FIGS. 2 and 6) or settling tank.

When the heating system 24 is applied to thin stillage or concentrated thin stillage, it hydrolyzes some of the suspended solids. As some of the solids become hydrolyzed (converted from suspended solids to dissolved solids), the viscosity of the stillage reduces. The value of this reduction in viscosity is the improved performance of any further downstream evaporator stage (e.g., a multi-effect evaporator to improve concentration). Generally, the limitation on water removal from these devices is viscosity. Essentially, evaporators continue to boil water out of the thin stillage producing concentrated thin stillage (or sometimes referred to as syrup). The evaporators are highly efficient and effective and the limitation is viscosity whereas the product gets so thick that the heat exchangers become less efficient and effective (fouling).

With hydrolyzation of solids, the viscosity of the thin stillage or concentrated thin stillage advantageously reduces and the highly efficient evaporators can remove more water, thus reducing the water loading on the less efficient final dryer (generally a steam tube or drum dryer). Furthermore, water can also be removed from the concentrated thin stillage post-evaporation through the use of a scraped surface heat exchanger, such as the above-mentioned Alfa Laval Dynamic unit. This device will continue to boil out additional water as the scraped surfaces continue to allow for sufficient heat transfer at high viscosities.

When the heating technique is applied to the whole stillage (see, e.g., FIG. 5), again solids become hydrolyzed and thus a greater amount of liquid exits the decanter(s) as thin stillage. The reduced concentration of suspended solids allow maximum concentration by the highly efficient evaporators, further minimizing the water removal requirements of the final dryer.

The foregoing description provides illustration of the inventive concepts. The descriptions are not intended to be exhaustive or to limit the disclosed invention to the precise form disclosed. Modifications or variations are also possible in light of the above teachings. For example, the syrup recovered from the centrifuge may be evaporated and processed again in a further effort to recover oil before drying. Moreover, in addition to a self-cleaning bowl type centrifuge as the means for recovering oil from the thin stillage, a nozzle bowl disk stack centrifuge would work, as could a horizontal centrifugal "tri-canter." The oil recovered using the disclosed processes and systems may also be used as "biodiesel" for powering motors, engines, or the like. Also, the heating system for freeing bound oil may be applied to whole stillage or thin stillage, and need not necessarily be positioned downstream of any device for processing the stillage, such as the evaporator shown in FIG. 10. Indeed, the pressure cooking and resulting hydrolyzation of solids could be applied to the raw input material before any Her processing occurs, to thin stillage before it undergoes any concentration step, or to concentrated thin stillage (regardless of the level of concentration achieved). Although not required, the hydrolyzing step advantageously makes the oil available for recovery and reduces viscosity during the concentrating step. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:

1. A method of recovering oil from stillage, including oil, resulting from a process used for producing ethanol, comprising:
   recovering whole stillage from the process used for producing the ethanol;
   mechanically processing the whole stillage to provide distillers wet grains and thin stillage;
   evaporating the thin stillage to form a thin stillage concentrate;
   heating the thin stillage concentrate to a temperature greater than 212° F. and a pressure sufficient to prevent boiling; and
   recovering the oil from the thin stillage concentrate.

2. The method of claim 1, wherein the temperature is at about 230° F. to less than about 250° F.

3. The method of claim 1, wherein the heating the thin stillage concentrate includes maintaining a pressure on the thin stillage concentrate of at least a vapor pressure effective to unbind at least part of the oil without boiling the thin stillage concentrate.

4. The method of claim 1, further comprising lowering the pressure after the heating but before the recovering the oil.

5. The method of claim 1, wherein the recovering the oil comprises separating the oil from the thin stillage concentrate using a gravity separation process.

6. The method of claim 1, further comprising cooling the thin stillage concentrate after heating and before recovering the oil.

7. A method of recovering oil from concentrated stillage including oil resulting from a process used for producing ethanol, comprising:
   pressure cooking the concentrated stillage at a temperature greater than 212° F. without boiling to unbind the oil from the stillage; and recovering the unbound oil.

8. A method of recovering oil from thin stillage including oil resulting from a process used for producing ethanol, comprising:
   evaporating the thin stillage to form a thin stillage concentrate;
   hydrolyzing solids in the thin stillage concentrate so as to reduce a viscosity of the concentrate; and
   recovering the oil from the thin stillage concentrate.

9. The method of claim 8, wherein hydrolyzing solids in the thin stillage concentrate comprises heating the stillage to a temperature greater than 212° F. at a pressure greater than atmospheric pressure without boiling.

10. The method of claim 8, further comprising cooling the thin stillage concentrate before recovering the oil.

11. The process of claim 1, wherein the recovering the oil comprises centrifuging the oil from the thin stillage concentrate.

* * * * *